US012462042B2

(12) United States Patent
Angelo et al.

(10) Patent No.: US 12,462,042 B2
(45) Date of Patent: Nov. 4, 2025

(54) USING THREAT INTELLIGENCE TO MANAGE SOFTWARE FIXES

(71) Applicants: Michael F. Angelo, Houston, TX (US); Alexander Michael Hoole, Vancouver BC (CA); Douglas Max Grover, Rigby, ID (US)

(72) Inventors: Michael F. Angelo, Houston, TX (US); Alexander Michael Hoole, Vancouver BC (CA); Douglas Max Grover, Rigby, ID (US)

(73) Assignee: Micro Focus LLC, Austin, TX (US)

( * ) Notice: Subject to any disclaimer, the term of this patent is extended or adjusted under 35 U.S.C. 154(b) by 52 days.

(21) Appl. No.: 18/533,849

(22) Filed: Dec. 8, 2023

(65) Prior Publication Data

US 2025/0190577 A1     Jun. 12, 2025

(51) Int. Cl.
*G06F 21/57*     (2013.01)
*G06F 16/951*     (2019.01)

(52) U.S. Cl.
CPC .......... *G06F 21/577* (2013.01); *G06F 16/951* (2019.01)

(58) Field of Classification Search
CPC .............. G06F 21/577; G06F 16/951
USPC ................... 726/25; 709/223, 224
See application file for complete search history.

(56) References Cited

U.S. PATENT DOCUMENTS 11,558,415 B1 * 1/2023 McDonald ............. G06N 20/00
11,770,401 B2 * 9/2023 Geil ................... H04L 63/1408
726/25
2009/0240680 A1 * 9/2009 Tankovich ........ G06F 16/24578
707/999.005
2015/0332053 A1 * 11/2015 Bhattacharya ........ G06F 21/577
726/25
2018/0113642 A1 * 4/2018 Huen .................... G06F 3/0605
2024/0330354 A1 * 10/2024 Alston .................. G06F 16/438

(Continued)

FOREIGN PATENT DOCUMENTS

CN       108848093 B   *   2/2021  ............. H04L 45/58

OTHER PUBLICATIONS

CISA Gov; Reducing the Significant Risk of Known Exploited Vulnerabilities; CISA Central—Central@cisa.dhs.gov; An Official Website of the U.S. Department of Homeland Security; 8 pages.

(Continued)

*Primary Examiner* — Liang Che A Wang
(74) *Attorney, Agent, or Firm* — Sheridan Ross P.C.

(57) ABSTRACT

A defect in the code of a software program is identified. An initial ranking for the defect in the code of the software program is determined. One or more network websites are crawled to identify information associated with the defect in the code of the software program. The information associated with the defect in the defect in the code of the software program is analyzed. In response to analyzing the information associated with the defect in the code of the software program, a second ranking is created for the defect in the code of the software program. The defects in the code of the software program and the second ranking are generated for display in a graphical user interface. By prioritizing which defects are more critical, the quality of the released software improved. In addition, the released software is more secure because critical defects have been removed.

17 Claims, 9 Drawing Sheets

(56) References Cited

U.S. PATENT DOCUMENTS

2024/0378309 A1\* 11/2024 Bhattacharya ........ G06F 21/602

OTHER PUBLICATIONS

GITHUB; 'Exploitdb'; https://github.com/topics/exploitdb; Dec. 2023; 7 pages.
Jay Jacobs, et al; EPSS Exploit Prediction Scoring System;; 2015-2023 by Forum of Incident Response and Security; Mar. 7, 2023, 5 pages.
Vasudeva, Weimin; A Knowledge-Based and Collaborative System for Security Assessment of We Applications; 1389/CHINP/2010; Aug. 13, 2010; 14 pages.

\* cited by examiner

USING THREAT INTELLIGENCE TO MANAGE SOFTWARE FIXES

FIELD

The disclosure relates generally to software development and particularly to management of fixes to code to improve the quality of the code.

BACKGROUND

Being able to identify the most critical defects/Common Vulnerability Exposures (CVEs) is an arduous task in software development. Many times, a defect/CVE that seems less important to address will suddenly become a highly visible critical defect/CVE. The current solutions are reactive, lacking the necessary information for analysis, and thus are not predictive or anticipatory of transitions in criticality. This results in a lower quality of the released software, which makes the released software more vulnerable to attacks and thus less secure.

SUMMARY

These and other needs are addressed by the various embodiments and configurations of the present disclosure. The present disclosure can provide a number of advantages depending on the particular configuration. These and other advantages will be apparent from the disclosure contained herein.

A defect in the code of a software program is identified. An initial ranking for the defect in the code of the software program is determined. One or more network websites, services, APIs, or the like are crawled to identify information associated with the defect in the code of the software program. The information associated with the defect in the code of the software program is analyzed. In response to analyzing the information associated with the defect in the code of the software program, a second ranking is created for the defect in the code of the software program. The defects in the code of the software program and the second ranking are generated for display in a graphical user interface to influence prioritization of fixes. By prioritizing which defects are more critical, the quality of the released software is improved. In addition, the released software is more secure because critical defects have been removed.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As defined herein and in the claims, the term "defect" may include any defect that is associated with code of a software program. A defect may be a new defect or a known CVE. A defect may be intentionally or unintentionally inserted into the code of a software application. A defect that is intentionally inserted into the code of a software application is considered to be malware, a virus, an insider threat, or the like. A defect that is unintentionally inserted into the code of a software application is considered a weakness or the like.

Weaknesses that can be exploited in a given context are considered vulnerabilities and are often represented by a CVE identifier once a patch is available and are publicly known.

As described herein and in the claims, the term "website" may comprise not just a website, but any device, Application Programming Interface (API), database, repository, and/or the like that resides on a network. A website may be a public website, a private website, and/or the like. In addition the website may be an application on a same device.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
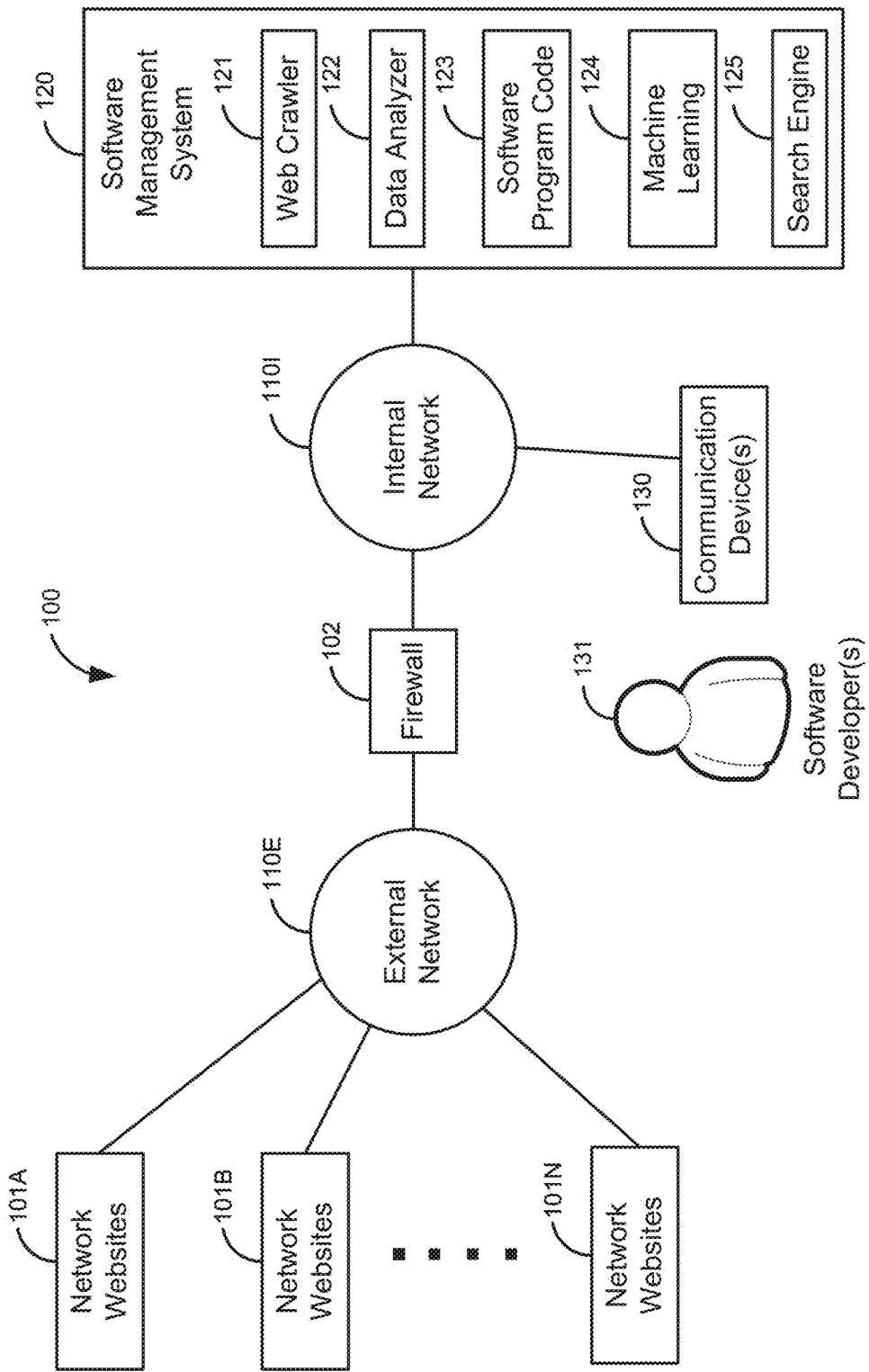
FIG. 1 is a block diagram of a first illustrative system for using threat intelligence to rank software fixes for code in a software program.

FIG. 1 is a block diagram of a first illustrative system 100 for using threat intelligence to rank software fixes for code in a software program. The first illustrative system 100 comprises network websites, services, APIs, or the like 101A-101N, an external network 110E, a firewall 102, an internal network 110I, a software management system 120, and communication device(s) 130.

In addition, software developer(s) 131 are shown for convenience. The software developer(s) 131 are typically developers of the software program code 123. The software developer(s) 131 may also include other users, such as a program manager, a product manager, an engineering manager, a person associated with the development process of the software program code 123, a user, and/or the like.

The network websites, services, APIs, or the like 101A-101N can be any website, services, APIS, or the like where information about defect(s) in code of a software program may reside. The network websites, services, APIs, and the like 101A-101N may be located on various networks 110. For example, the network websites 101A-101N may be located in different countries on the Internet, on a private network, on the internal network 110I, and/or the like. The network websites, services, API, or the like 101A-101N may be different types of websites, such as open-source repositories (e.g., GitHub), the dark web, malicious websites, hacker discussion boards, news media websites, published articles, social media networks, social media feeds (e.g., Twitter®), government websites, and/or the like. In another exemplary embodiment, the network services 101A-101N can be any network service, API, device, or the like, capable of delivering information about defect(s) in code of a software program.

The external network 110E can be or may include any collection of communication equipment that can send and receive electronic communications, such as the Internet, a Wide Area Network (WAN), a Local Area Network (LAN), a packet switched network, a circuit switched network, a wireless network, a combination of these, and the like. The network 110E can use a variety of electronic protocols, such as Ethernet, Internet Protocol (IP), Hyper Text Transfer Protocol (HTTP), Web Real-Time Protocol (Web RTC), and/or the like. Thus, the network 110E is an electronic communication network configured to carry messages via packets and/or circuit switched communications.

The firewall 102 can be any device that provides security between the external network 110E and the internal network 110I, such as a network address translator, a packet filtering firewall, a circuit-level gateway, an application-level gateway, a stateful inspection firewall, a next-generation firewall, and/or the like. The firewall 102 is used to protect the internal network 110I from hackers/malicious parties.

The internal network 110I can be or may include any collection of communication equipment that can send and receive electronic communications, such as a Wide Area Network (WAN), a Local Area Network (LAN), a packet switched network, a circuit switched network, a corporate network, a business network, a government network, a combination of these, and the like. The internal network 110I can use a variety of electronic protocols, such as Ethernet, Internet Protocol (IP), Hyper Text Transfer Protocol (HTTP), Web Real-Time Protocol (Web RTC), and/or the like. Thus, the internal network 110I is an electronic communication network configured to carry messages via packets and/or circuit switched communications.

The software management system 120 can be or may include any hardware coupled with software/firmware that provides management services for developing the software program code 123. The software management system 120 may provide various types of development services, such as code management, code check-in/control, software development tracking, software development forecasting, and/or the like. While shown connected to the internal network 110I, the software management system 120 may reside on the external network 110E.

The software management system 120 further comprises a web crawler 121, a data analyzer 122, the software program code 123, machine learning 124, and a search engine 125. The web crawler 121 can be or may include any hardware coupled with software that can be used to crawl the network websites or other embodiments of 101A-101N. The web crawler 121 may capture various types of data from the network websites 101A-101N, such as user identity information, defect information (e.g., defect identifiers, defect types, defect names, defect issues, defect severity, etc.), defect source code, links to other websites, articles, defect attack code, posted documents, social media comments, social media threads (i.e., conversations between multiple users), encryption keys, authentication credentials, license keys, user information, account information, and/or the like.

The data analyzer 122 can be or may include any hardware coupled with software/firmware that can analyze the information associated with defects in the software program code 123. The data analyzer 122 can use the machine learning 124 to identify similar types of defect information via training the machine learning 124 with historical data that has been crawled from the network websites 101A-101N.

The software program code 123 can be any software/firmware code used to generate a software program. A software program may include a firmware program. The software program may be any type of program or software component, such as a financial application, a security application, a web application, a document management program, a testing program, a database application, a networked application, a library, a framework, a reusable component, and/or the like. The software program code 123 may be written in various types of programming languages, such as Java, JavaScript, C, C++, Web RTC, shell script, assembly, Python, Ruby, PUP, Perl, COBOL, Lisp, Pascal, and/or the like. Although shown in the software management system 120, the software program code 123 may reside externally to the software management system 120. For example, the software program code 123 may reside in a code repository on the internal network 110I, in a code repository on the external network 110E, a combination of the above, and/or the like. The software program code 123 may comprise proprietary code, open-source code, third party code, and/or the like.

The machine learning 124 can be any type of machine learning 124 that can be used to identify information associated with defects in the software program code 123. The machine learning 124 may use different types of machine learning algorithms, such as supervised machine learning, semi-supervised machine learning, unsupervised machine learning, reinforcement machine learning, and/or the like. The machine learning 124 may comprise multiple machine learning algorithms.

The search engine 125 can be any software/hardware that can search a network 110. For example, the search engine 125 may search the external network 110E to identify which of the network websites 101A-101N have information about a particular defect or group of defects. The search engine 125 may use a generic search algorithm or a specific search algorithm designed to identify information related to the defect(s).

The communication device(s) 130 can be or may include any device that the developer 131 can use to communicate with the software management system 120, such as a Personal Computer (PC), a cellular telephone, a Personal Digital Assistant (PDA), a tablet device, a notebook device, a smartphone, and/or the like. As shown in FIG. 1, any number of communication device(s) 130 may be connected to the internal network 110I, including only a single communication device 130.

Figure 2:
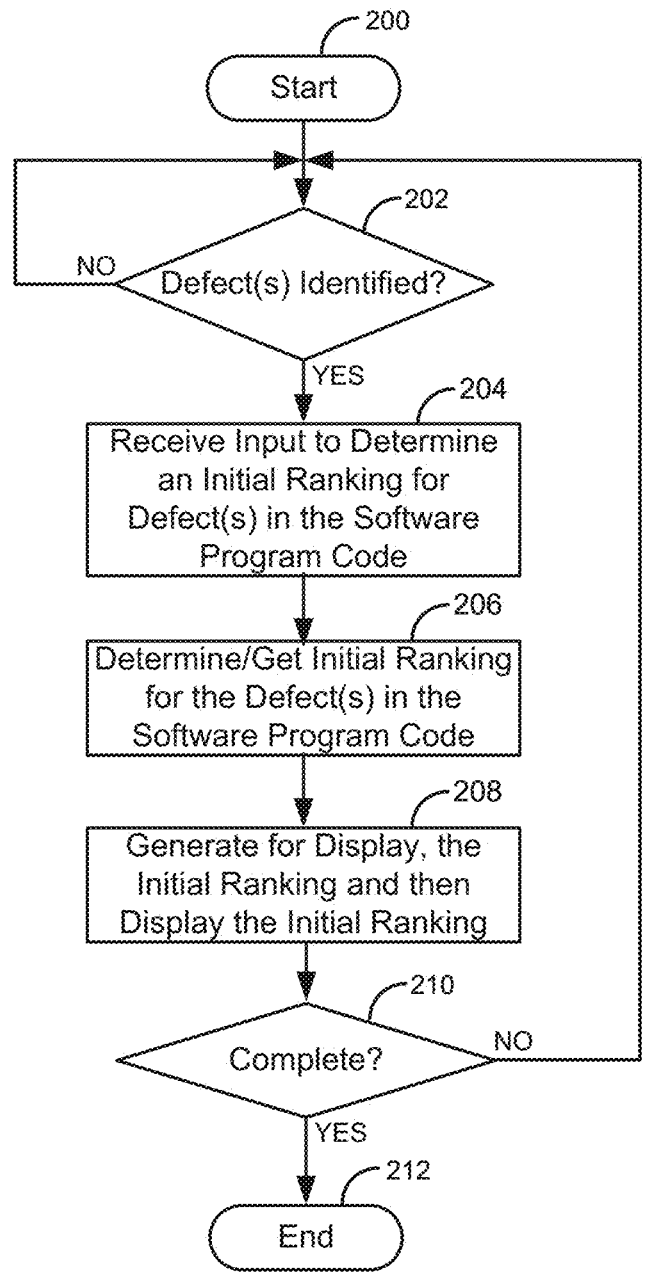
FIG. 2 is a flow diagram of a process for gathering input to determine an initial ranking for a defect in code of a software program.

FIG. 2 is a flow diagram of a process for gathering input to determine an initial ranking for a defect in the software program code 123. Illustratively, in one embodiment, the network websites 101A-101N, the firewall 102, the software management system 120, the web crawler 121, the data analyzer 122, the software program code 123, the machine learning 124, the search engine 125, and the communication device(s) 130 are stored-program-controlled entities, such as a computer or microprocessor, which performs the method of FIGS. 2-9 and the processes described herein by executing program instructions stored in a computer readable storage medium, such as a memory (i.e., a computer memory, a hard disk, and/or the like). Although the methods described in FIGS. 2-9 are shown in a specific order, one of skill in the art would recognize that the steps in FIGS. 2-9 may be implemented in different orders and/or be implemented in a multi-threaded environment. Moreover, various steps may be omitted or added based on implementation.

The process starts in step 200. The data analyzer 122 determines if any intentional or unintentional defect(s) have been identified in step 202. If no defects have been identified in step 202, the process of step 202 repeats.

Otherwise, if one or more defects have been identified in step 202, the data analyzer 122 receives input, in step 204, to determine an initial ranking for defect(s) in the software program code 123. The initial ranking may come from various sources, such as, from the software developer 131, from another user (e.g., a product manager), from a code repository, from a repository of known defects, and/or the like. The data analyzer 122 determines, in step 206, the initial ranking for the defect(s) in the software program code 123. The determined initial ranking may be from a single person, based on input from multiple people, multiple data sources, or a combination thereof. The initial ranking is generated for display (e.g., provided by a web server to a browser) and then displayed (e.g., by the browser) in step 208.

The data analyzer 122 determines, in step 210, if the process is complete. If the process is not complete in step 210, the process goes back to step 202. Otherwise, if the process is complete in step 210, the process ends in step 212.

Figure 3:
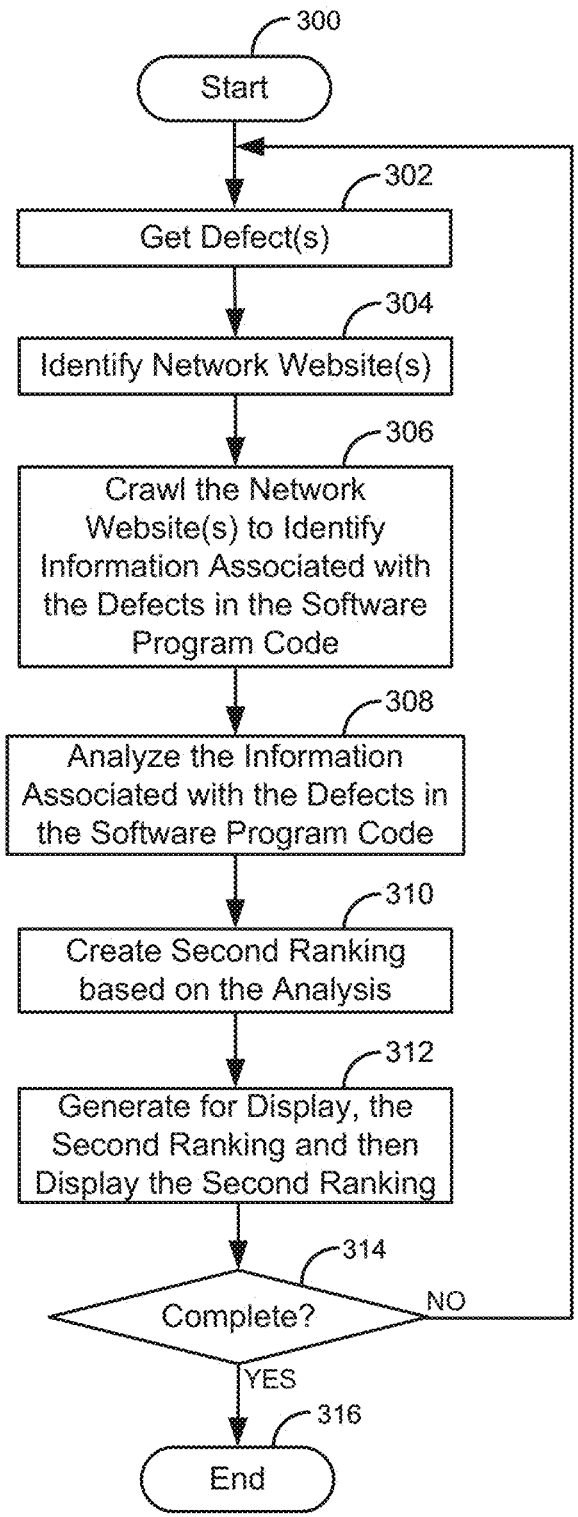
FIG. 3 is a flow diagram of a process for crawling network website(s) to identify information associated with defects in software program code.

FIG. 3 is a flow diagram, representing an exemplary implementation where data is gathered from websites, of a process for crawling network website(s) 101A-101N to identify information associated with defects in the software program code 123. The process starts in step 300. The data analyzer 122 gets the defect(s) (e.g., the defects identified in step 202) in step 302. The defect(s) can be various kinds of undesirable intentional or unintentional defects, such as malware, viruses, backdoor passwords, unused links that can be exploited, cross-site scripting defects, exposure of secure data, weak encryption, access breaches, data overwrite defects, system crash defects, and/or the like. The data analyzer 122 identifies the network website(s) 101 in step 304. The data analyzer 122 may identify the network website(s) 101 in various ways, such as, by getting a known list of addresses of the network websites 101A-101N, by doing a search, by searching based on a type of network website 101, by a location of a network website 101, by learning over time (e.g., using the machine learning 124), and/or the like.

The web crawler 121 crawls the network website(s) 101A-101N, in step 306, to identify information associated with the defects in the software program code 123. For example, the web crawler 121 may crawl opensource repositories (e.g., GitHub), dark websites, malicious websites, hacker discussion boards, news media, published articles, news feeds, government websites, and/or the like to identify additional threat information about the defects.

The data analyzer 122 analyzes, in step 308, the information associated with the defects in the software program code 123. Step 308 may use the machine learning 124 to help filter/identify specific types of information that are useful in reranking a defect. The data analyzer 122 creates, in step 310, a second ranking based on the analysis of step 308. The second ranking (the reranking) may be to increase the priority, not modify the priority, or to lower the priority of the initial ranking of step 206. In an example embodiment, any time an existing ranking/priority is modified, a registration mechanism exists for configuring actions/events to be triggered in order to enable additional workflows/processes to proceed in response to the change in ranking. For example, the machine learning 124 can identify different users as being a notorious user, an expert user, a fake poster, a semi-legitimate poster, commentors on a post, users looking at the post, and/or the like. Likewise, the machine learning 124 may identify specific network websites 101 or media outlets and rank/weight them based on previous crawls of the network websites 101A-101N. For example, a particular network website 101 may be identified as typically having accurate information, whereas another network website 101 may be ranked lower based on previous false positives/inaccurate information.

Another example is where the crawling process identifies where on the external network 110E the defect is being discussed, who is posting (e.g., are they a notorious hacker, a security expert, etc.), who is commenting on the post, who is looking at the post, is exploitation code being posted/discussed (code to attack the defect), how much chatter on the dark web is occurring about the defect (is there an increase or decrease), how many people/companies are being impacted, are there articles being published about the defect, are there Federal Government fix dates, are there leaks of a defect (e.g., is someone talking on the dark web about a particular CVE that is supposed to be private), are there potential financial impacts, are companies reporting the defect, and/or the like. Likewise, the opposite may occur. For example, a defect may be initially ranked as a high priority. However, based on the lack of chatter/discussion on the Internet, the defect's initial ranking may be lowered and deprioritized.

The machine learning 124 may be trained based on existing defects that were eventually deemed to be critical where initially they were not deemed to be critical. Likewise, the machine learning 124 can also be trained on what to look for to lower the initial ranking.

Based on analyzing the information associated with the defect(s), a second ranking is created for each defect in step 310. The second ranking is then generated for display (e.g., a web page is updated) and then displayed to a user (e.g., in a graphical user interface) in step 312. For example, the new ranking(s) can be displayed to a user along with the reasons why the priority has been changed and/or the display could show suggested rankings of the list of defects based on the machine learning 124.

This process of analyzing the information associated with the defect(s) can be accomplished in real-time as software program code 123 is being developed. An alternative may be where the user defines periodic intervals of when to re-run the analysis. For example, the software developer 131 may set the analysis to run every day or every week. In addition, the software developer 131 may request the analysis to be run at any time.

The data analyzer 122 determines, in step 314, if the process is complete. If the process is not complete in step 314, the process goes back to step 302 to repeat the process. Otherwise, if the process is complete in step 314, the process ends in step 316.

Figure 4:
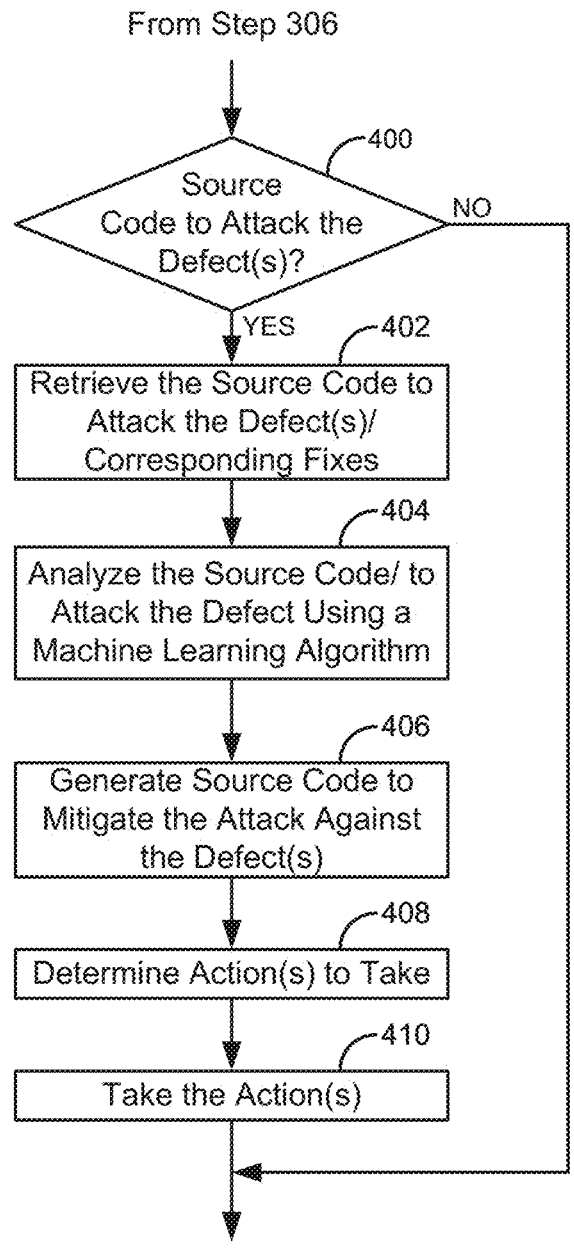
FIG. 4 is a flow diagram of a process for capturing code for attacking defects and creating code to counter-act/mitigate the code for attacking the defects.

FIG. 4 is a flow diagram of a process for capturing code for attacking defects and creating code to counter-act/mitigate the code for attacking the defects. The process of FIG. 4 goes between steps 306 and 308 of FIG. 3. The process of FIG. 4 may be expanded to use different algorithms to detect viruses and/or malware. For viruses/malware, the process may be to remove the malware and/or modify the source code so that the malware is no longer malicious.

After crawling the network website(s) 101A-101N in step 306, the data analyzer 122 determines, in step 400, if the information associated with the defect comprises source code to attack the defect(s). For example, a hacker may have posted source code to attack a specific defect on a dark network website 101. If the information associated with the defect does not comprise source code to attack the defect(s) in step 400, the process goes to step 308.

Otherwise, if the information associated with the defect comprises source code to attack one or more defects in step 400, the data analyzer 122 retrieves the source code to attack the defect(s) in step 402. The data analyzer 122/machine learning 124 analyzes the source code to attack the defect in step 404. For example, the machine learning 124 may be trained using historical code that was previously used to attack different types of similar defects and their corresponding fixes. The machine learning 124 generates source code to counter-act/mitigate the source code to attack the defect (s) in step 406.

The data analyzer 122 determines, in step 408, action(s) to take. For example, the action may be to automatically fix, or fix based on the developer's input the defect in the software program code 123, to display the source code to counter-act/mitigate the defect, to ignore the defect (e.g., based on user input), to mitigate the defect from the specific attack in a runtime environment, and/or the like. The action is then taken in step 410 and the process then goes to step 308.

Figure 5:
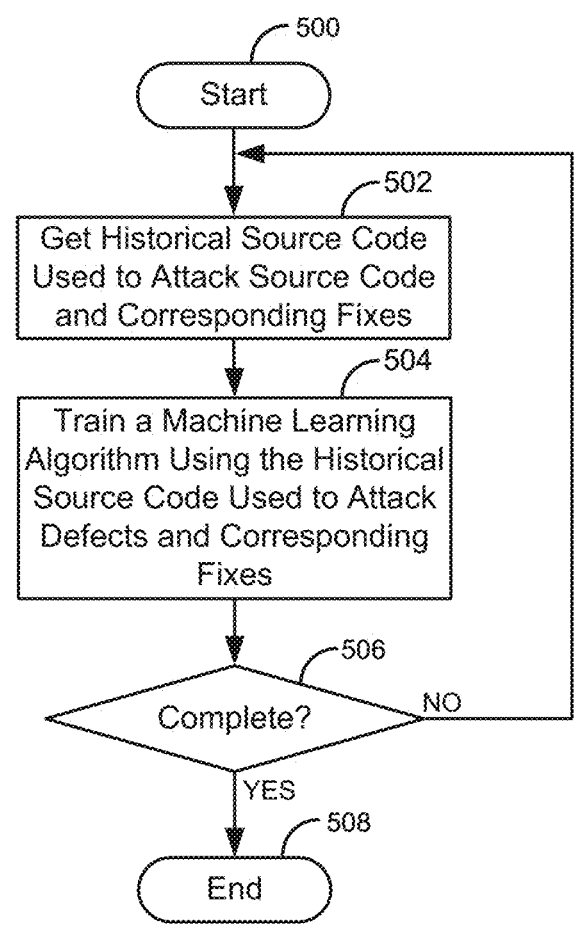
FIG. 5 is a flow diagram of a process for training an artificial intelligence algorithm to generate code to counter-act/mitigate the code for attacking defects.

FIG. 5 is a flow diagram of a process for training an artificial intelligence algorithm to generate code to counter-act/mitigate the code for attacking defects. FIG. 5 may also be used for viruses/malware. For viruses/malware, FIG. 5 may be to get the virus/malware patterns. The process starts in step 500. The machine learning 124 gets historical source code used to attack defects and their corresponding fixes in step 502. The source code used to attack the defects may be snippets of code and/or full software applications. The source code used to fix defects may be snippets of source code that have been used to fix various kinds of defects that occur in different kinds of software program code 123. The source code used to attack the defects may come from a malicious network website 101, from a published article, from a social media site, from a database, and/or the like. The source code used to fix defects may come from various sources, such as, open-source repositories, proprietary source code, and/or the like. The machine learning 124 is trained, in step 504, using the historical source code used to attack the defects and the source code used to fix the defects.

The machine learning 124 determines, in step 506, if the process is complete. If the process is not complete in step 506, the process goes back to step 502. Otherwise, if the process is complete in step 506, the process ends in step 508.

Figure 6:
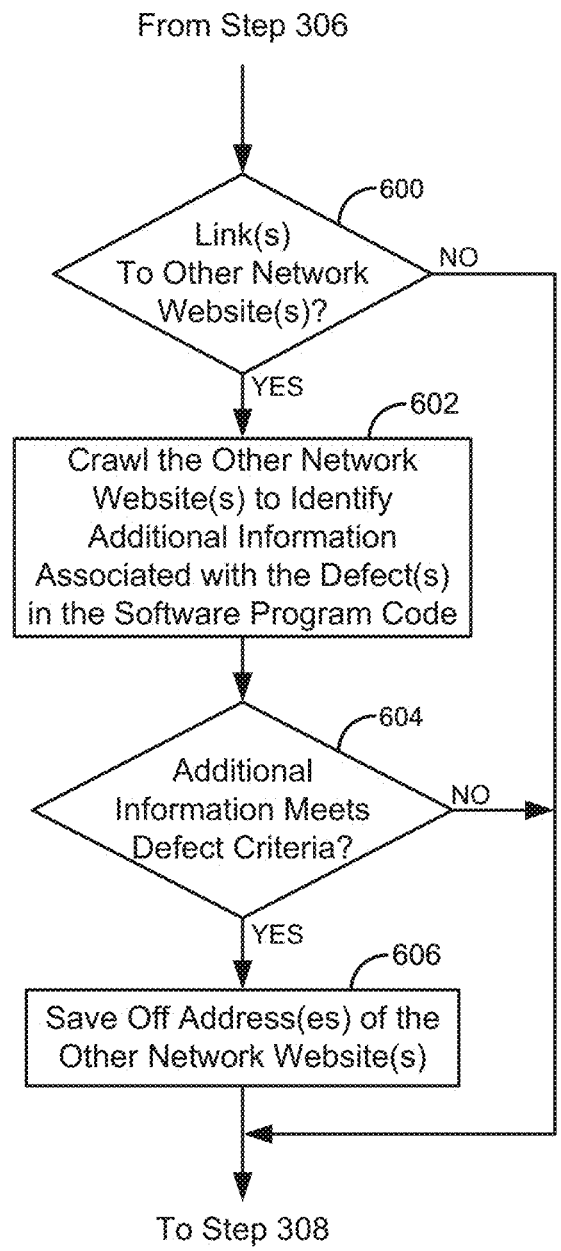
FIG. 6 is a flow diagram of a process for crawling additional network website(s) based on links within crawled network website(s).

FIG. 6 is a flow diagram of a process for crawling additional network website(s) 101 based on links within the crawled network website(s) 101. The process of FIG. 6 goes between steps 306 and 308 of FIG. 3. After crawling the network websites 101A-101N to identify information associated with the defects in the software program code 123, the data analyzer 122 determines, in step 600, if there are links to other network websites 101. A link to another network website 101 may be a Universal Resource Locator (URL), a link to another user's social media webpage, a link to a different network website 101, a link to an article, a link to a new feed, a link to a government network website 101, a link to a corporate website, and/or the like. For example, a first user may have posted a comment about the defect. A second user then posts about the first user's comment. In this example, the link would be a link to the second user's webpage where the second user is the primary poster. If there are no links to other network websites 101 in step 600, the process goes to step 308.

Otherwise, if there are other links to other network websites 101 in step 600, the web crawler 121 crawls the other network website(s) 101 to identify additional information associated with the defect(s) in the software program code 123 in step 602. The other network website(s) 101 may be new network websites 101 that have never been crawled previously. The data analyzer 122 determines, in step 604, if the additional information associated with the defect(s) meets defect criteria. The defect criteria may vary based on a specific type of defect, may be the same for all defects, and/or the like. For example, the link may be to a network website 101 that does not discuss any type of defect. In this case, the link will not meet the defect criteria. If the link does discuss the defect and/or other defects, the link would likely meet the defect criteria.

If the additional information does not meet the defect criteria in step 604, the process goes to step 308. Otherwise, if the additional information meets the defect criteria in step 604, the data analyzer 122 saves off the address(es) of the other network website(s) 101 in step 606. The saved address of the other network website(s) 101 may be used as part of the process for identifying the network website(s) 101A-101N in step 304 of FIG. 3. In addition, this information may then be used as historical information to train the machine learning 124 (e.g., as described in FIG. 5) for future defects. The process then goes to step 308.

The process of FIG. 6 may work with multiple links where some of the links meet the defect criteria and some of the links do not meet the defect criteria. For example, if there are multiple links in step 604, some of the links may be filtered out and some of the link's addresses may be saved off in step 606.

Figure 7:
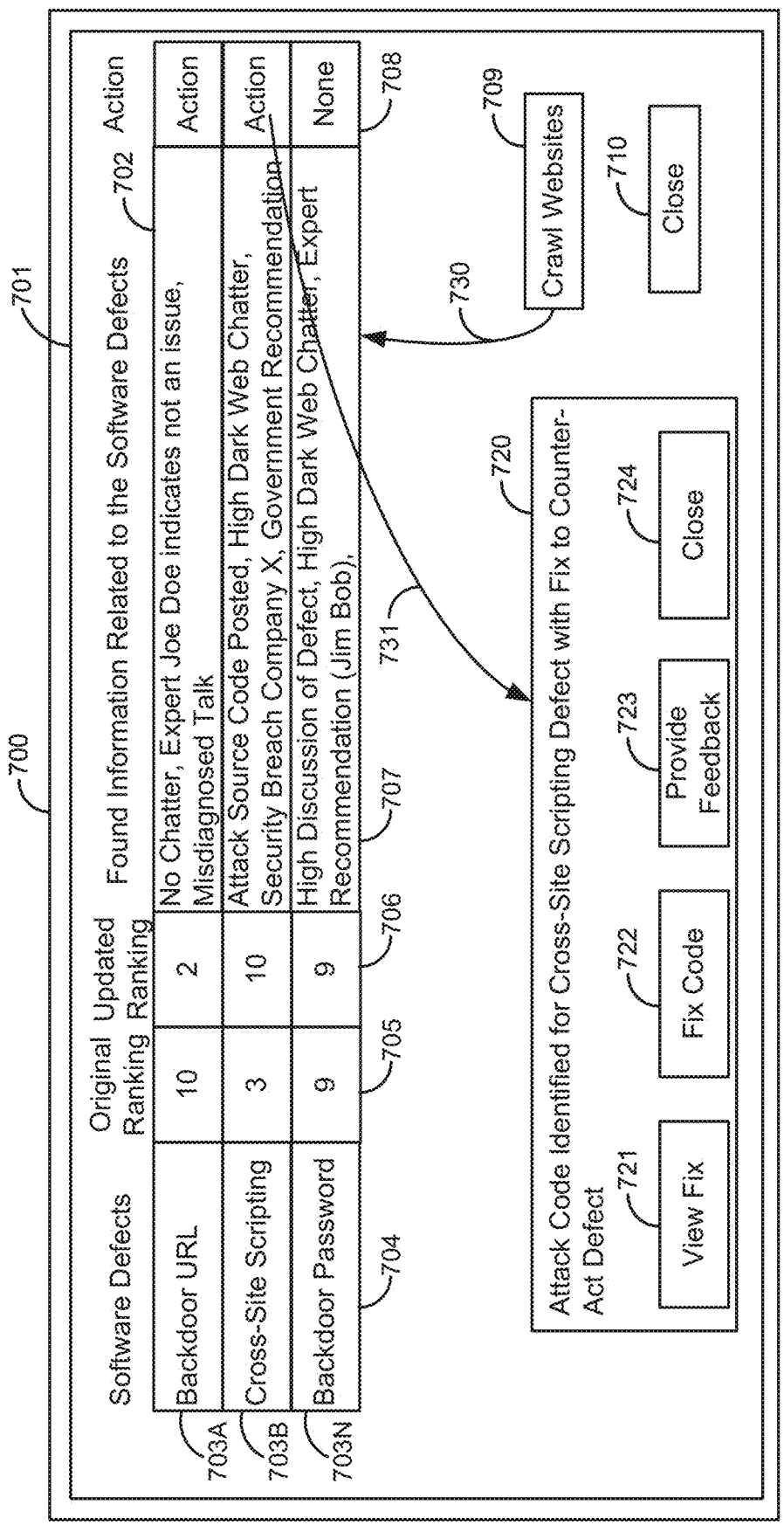
FIG. 7 is a diagram of a graphical user interface for managing defects in a software development cycle.

FIG. 7 is a diagram of a graphical user interface 700 for managing defects 703A-703N in a software development cycle. The graphical user interface 700 comprises a defect window 701 and an attack code management window 720.

The defect window 701 comprises a defect list 702, a crawl websites button 709, and a close button 710. The defect list 702 comprises defects 703A-703N, a software defect column 704, an original ranking column 705, an updated ranking column 706, an information column 707, and an action column 708. For each of the defects 703A-703N, each of the columns 704-708 allow the software developer 131 to view specific information related to the defects 703A-703N. The software defect column 704 shows each of the defects 703A-703N: Backdoor URL, Cross-Site Scripting, and Backdoor URL. Each of defects 703A-703N have an original ranking (on a scale of one to ten (ten being the most severe)). The backdoor URL defect 703A has an original ranking of ten; the cross-site scripting defect 703B has an original ranking of three; and the backdoor password defect 703N has an original ranking of nine.

Initially only the software defects column 704 and the original ranking column 705 are shown. The software developer 131 clicks on the crawl websites button 709 in step 730 to initiate the network websites 101A-101N crawling process described in FIG. 3. As the crawling process completes (could be continuous) the updated ranking (a second ranking) column 706, the information column 707, and the action column 708 are then displayed to the software developer 131. The updated ranking column 706 is generated from step 312 of FIG. 3. The information column 707 is generated from the information gathered in step 306 of FIG. 3. The action column 708 is generated based on FIG. 4.

The software developer 131 may click on an individual action in the action column 708 of a particular defect 703 to determine how to handle attack code found on a network website 101. For example, the software developer 131 has clicked, in step 731, on the action in the action column 708 for the cross-site scripting defect 703B. This results in the display of the attack code management window 720. The attack code management window 720 comprises a view fix button 721, a fix code button 722, a provide feedback button 723, and a close button 724.

The attack code management window 720 allows the software developer 131 to determine how to handle attack code that was found for the cross-site scripting defect 703B (e.g., as described in FIG. 4). For example, the software developer 131 may want to view the fix to counter-act/mitigate the attack code for defect 703B by clicking the view fix button 721. The software developer 131 may click on the fix code button 722 to automatically fix the defect 703B in the software program code 123.

The software developer 131 may provide feedback to the machine learning 124 to improve the attack code analysis by clicking on the provide feedback button 723. For example, the software developer 131 may provide feedback for a particular code fix that the generated code to counter-act/mitigate the attack code is not valid.

The software developer 131 may click on the close button 724 to close the attack code management window 720. Likewise, the software developer 131 may click on the close button 710 to close the defect window 701.

The software developer 131 may click on an individual item in the information column 707 to get more detailed information about a particular defect 703A-703N. The more detailed information may show links to the specific web sites/articles/new media where the defect 703 is being discussed. The software developer 131 can then click on the links to view the information to better make an informed decision about how to handle the defect(s) 703.

Although not shown, the defect window 701 may show additional information, such as, potential impact costs, additional development costs, lost sales costs, and/or the like. For example, the data analyzer 122 could calculate development costs, projects loss of sales costs, and/or the like to aid the software developer 131 in deciding whether to accept the updated rankings. This information may also factor in generating the updated ranking in the updated ranking column 706.

Figure 8:
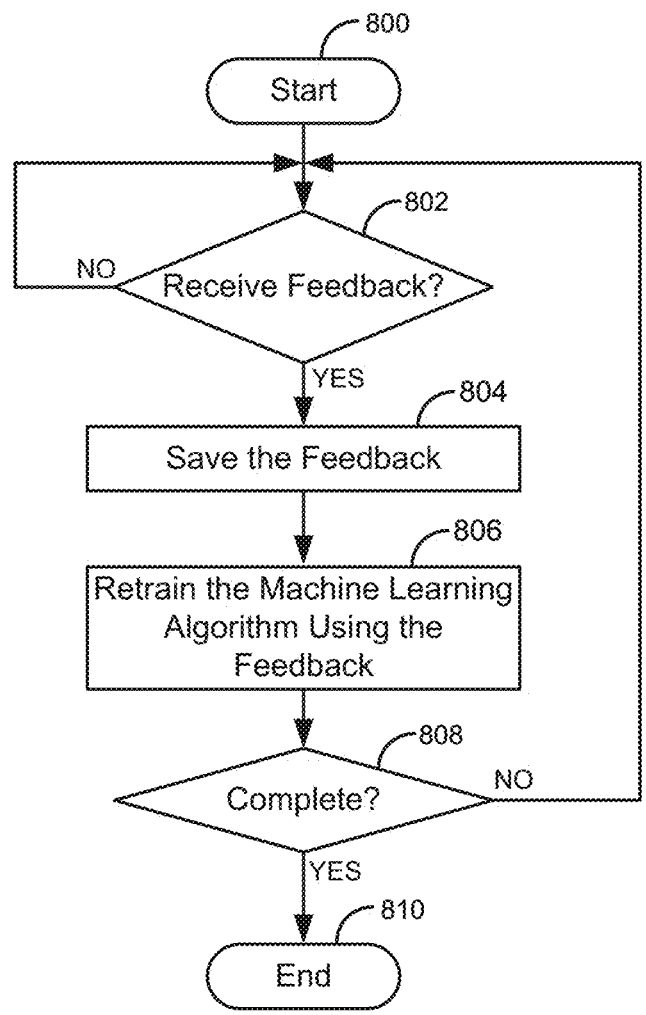
FIG. 8 is a flow diagram of a process for getting feedback and retraining a machine learning algorithm based on the feedback.

FIG. 8 is a flow diagram of a process for getting feedback and retraining a machine learning algorithm based on the feedback. The process starts in step 800. The machine learning 124 determines, in step 802, if the software developer 131 has provided feedback. For example, the software developer 131 may have clicked on the provide feedback button 723 and then provided feedback about the defect 703. The feedback could also be for specific user, a specific web site/media outlet, a specific conversation, a specific username (e.g., who posted information about a defect 703), and/or the like. The software developer 131 can the provide feedback (e.g., comments) that is analyzed by the machine learning 124. The comments can be used to train for a specific user or company (e.g., where the process is proved as part of a Software as a Service (SaaS) solution).

If the software developer 131 has not provided feedback in step 802, the process of step 802 repeats. Otherwise, if the software developer 131 has provided feedback in step 802, the machine learning 124 saves the feedback in step 804. The machine learning algorithm is retrained using the feedback in step 806. The retraining process may use the feedback to further enhance the training process. For example, if the software developer 131 determines that one of the updated rankings (shown in the updated rankings column 706) is incorrect, the software developer 131 can provide feedback that is used to retrain the machine learning 124.

The machine learning 124 determines, in step 808, if the process is complete. If the process is not complete in step 808, the process goes back to step 802. Otherwise, if the process is complete in step 808, the process ends in step 810.

Figure 9:
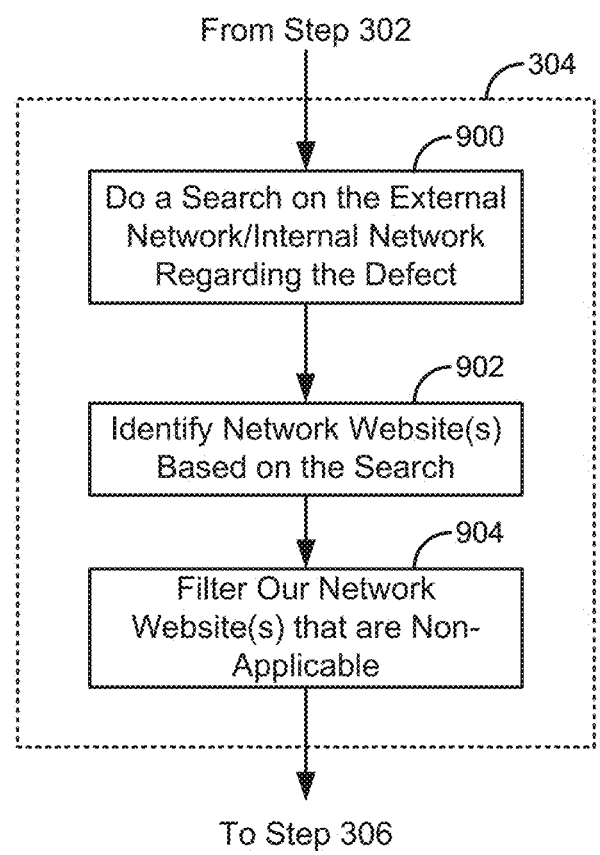
FIG. 9 is a flow diagram of a process for identifying network websites that have information associated with a defect.

FIG. 9 is a flow diagram of a process for identifying network websites 101A-101N that have information associated with a defect 703. The process of FIG. 9 is an exemplary embodiment of step 304 of FIG. 3. After getting the defect(s) 703 in step 302, The search engine 125 does a search on the external network 110E and/or the internal network 110I regarding the defect 703 in step 900. For example, the search engine 125 may use a set of Application Programming Interfaces for an existing search engine 125. The search engine 125 identifies the network website(s) 101A-101N based on the search in step 902. The data analyzer 122 filters out any of the network websites 101A-101N that are not applicable in step 904. The data analyzer 122 may filter out network website(s) 101 based on defined criteria associated with a particular type of defect 703. For example, the data analyzer 122 may filter out a particular network website 101 based on the fact that the owner of the network website 101 has in the past proven to not be a reliable source of information about defects 703. The process then goes to step 306.

In another embodiment, the embodiments described herein could be offered as a Software as a Service (SaaS) service. In this embodiment, the processes described herein may partially or all be implemented and provided to different users/groups/companies as part of a subscription service.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
get a defect in code of a software program;
get an initial ranking for the defect in the code of the software program;
crawl one or more network websites to identify information associated with the defect in the code of the software program, wherein the information associated with the defect in the code of the software program comprises first source code to attack the defect;
analyze the information associated with the defect in the code of the software program;
in response to analyzing the information associated with the defect in the code of the software program, create a second ranking for the defect in the code of the software program;
generate for display, in a graphical user interface, the defect in the code of the software program and the second ranking:
retrieve the first source code to attack the defect;
analyze the first source code to attack the defect using a machine learning algorithm; and generate, by the machine learning algorithm, second source code to mitigate the first source code to attack the defect.

2. The system of claim 1, wherein the microprocessor readable and executable instructions further cause the microprocessor to at least one of:
fix the defect in the code of the software program; and
generate, for display in a graphical user interface, the second source code to mitigate the first source code to attack the defect.

3. The system of claim 1, wherein the machine learning algorithm is trained using source code used to attack a plurality of defects and the corresponding fixes.

4. The system of claim 1, wherein the microprocessor readable and executable instructions further cause the microprocessor to:
identify a link to a second network website in the information associated with the defect in the code of the software program, wherein the second network website is not one of the one or more network websites; and
in response to identifying the link to the second network website in the information associated with the defect in the code of the software program, crawl the second network website to identify additional information associated with the defect in the code of the software program.

5. The system of claim 4, wherein the microprocessor readable and executable instructions further cause the microprocessor to:
determine, if the additional information associated with the defect in the code of the software program meets defect criteria; and
in response to determining that the additional information associated with the defect in the code of the software program meets the defect criteria, save an address of the second network website.

6. The system of claim 1, wherein the information associated with the defect in the code of the software program comprises one or more of: a notorious user, an expert user, a fake poster, a semi-legitimate poster, a commentor on a post, users looking at the post, source code to attack the defect, an increase of chatter on a dark web about the defect, a decrease of the chatter on the dark web about the defect, a number of companies impacted by the defect, a number of articles published about the defect, a federal government fix date for the defect, a public posting of private information about the defect, a potential financial impact of the defect, and a number of companies reporting the defect.

7. The system of claim 1, wherein analyzing the information associated with the defect in the code of the software program is accomplished by a machine learning algorithm and wherein the microprocessor readable and executable instructions further cause the microprocessor to:
receive, from a graphical user interface, feedback from a user about the second ranking; and
in response to receiving the feedback from the user about the second ranking, providing the information about the second ranking to retrain the machine learning algorithm.

8. A method comprising:
identifying, by a microprocessor, a defect in code of a software program;
get, by the microprocessor, an initial ranking for the defect in the code of the software program;
crawling, by the microprocessor, one or more network websites to identify information associated with the defect in the code of the software program, wherein the information associated with the defect in the code of the software program comprises first source code to attack the defect;
analyzing, by the microprocessor, the information associated with the defect in the code of the software program;
in response to analyzing the information associated with the defect in the code of the software program, creating, by the microprocessor, a second ranking for the defect in the code of the software program;
generating for display, by the microprocessor, in a graphical user interface, the defect in the code of the software program and the second ranking;
retrieving the first source code to attack the defect;
analyzing the first source code to attack the defect using a machine learning algorithm; and
generating, by the machine learning algorithm, second source code to mitigate the first source code to attack the defect.

9. The method of claim 8, further comprising at least one of:
fixing the defect in the code of the software program; and
generating, for display in a graphical user interface, the second source code to mitigate the first source code to attack the defect.

10. The method of claim 8, wherein the machine learning algorithm is trained using source code used to attack a plurality of defects and the corresponding fixes.

11. The method of claim 8, further comprising:
identifying a link to a second network website in the information associated with the defect in the code of the software program, wherein the second network website is not one of the one or more network websites; and
in response to identifying the link to the second network website in the information associated with the defect in the code of the software program, crawling the second network website to identify additional information associated with the defect in the code of the software program.

12. The method of claim 11, further comprising:
determining, if the additional information associated with the defect in the code of the software program meets defect criteria; and
in response to determining that the additional information associated with the defect in the code of the software program meets the defect criteria, saving an address of the second network website.

13. The method of claim 8, wherein the information associated with the defect in the code of the software program comprises one or more of: a notorious user, an expert user, a fake poster, a semi-legitimate poster, a commentor on a post, users looking at the post, source code to attack the defect, an increase of chatter on a dark web about the defect, a decrease of the chatter on the dark web about the defect, a number of companies impacted by the defect, a number of articles published about the defect, a federal government fix date for the defect, a public posting of private information about the defect, a potential financial impact of the defect, and a number of companies reporting the defect.

14. The method of claim 8, wherein analyzing the information associated with the defect in the code of the software program is accomplished by a machine learning algorithm and further comprising:
receiving, from a graphical user interface, feedback from a user about the second ranking; and in response to receiving the feedback from the user about the second ranking, providing the information about the second ranking to retrain the machine learning algorithm.

15. A non-transient computer readable medium having stored thereon instructions that cause a microprocessor to execute a method, the method comprising instructions to:
get a defect in code of a software program;
get an initial ranking for the defect in the code of the software program;
crawl one or more network websites to identify information associated with the defect in the code of the software program, wherein the information associated with the defect in the code of the software program comprises source code to attack the defect;
analyze the information associated with the defect in the code of the software program;
in response to analyzing the information associated with the defect in the code of the software program, create a second ranking for the defect in the code of the software program;
generate for display, in a graphical user interface, the defect in the code of the software program and the second ranking;
retrieve a first source code to attack the defect;
analyze the first source code to attack the defect using a machine learning algorithm; and
generate, by the machine learning algorithm, second source code to mitigate the first source code to attack the defect.

16. The non-transient computer readable medium of claim 15, wherein the instructions further cause the microprocessor to at least one of:
fix the defect in the code of the software program; and
generate, for display in a graphical user interface, the second source code to mitigate the first source code to attack the defect.

17. The non-transient computer readable medium of claim 15, wherein the instructions further cause the microprocessor to:
identify link to a second network website in the information associated with the defect in the code of the software program, wherein the second network website is not one of the one or more network websites; and
in response to identifying a second link to the second network website in the information associated with the defect in the code of the software program, crawl the second network website to identify additional information associated with the defect in the code of the software program.

* * * * *